Nov. 4, 1952        F. ZERNIKE        2,616,334
PHASE MICROSCOPY
Filed May 12, 1948        2 SHEETS—SHEET 1
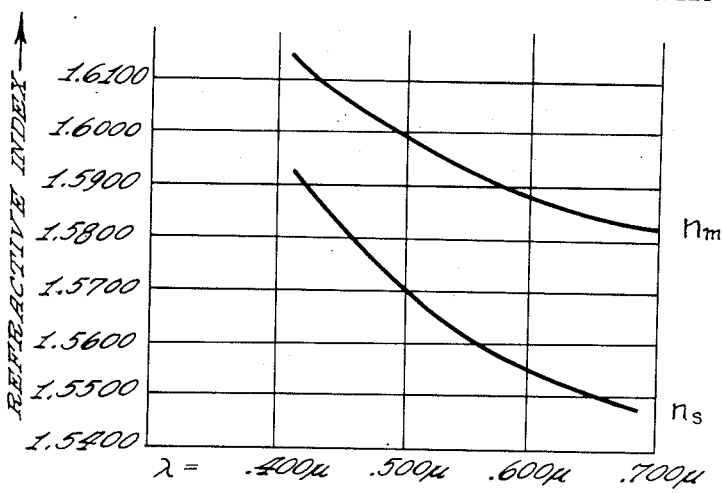
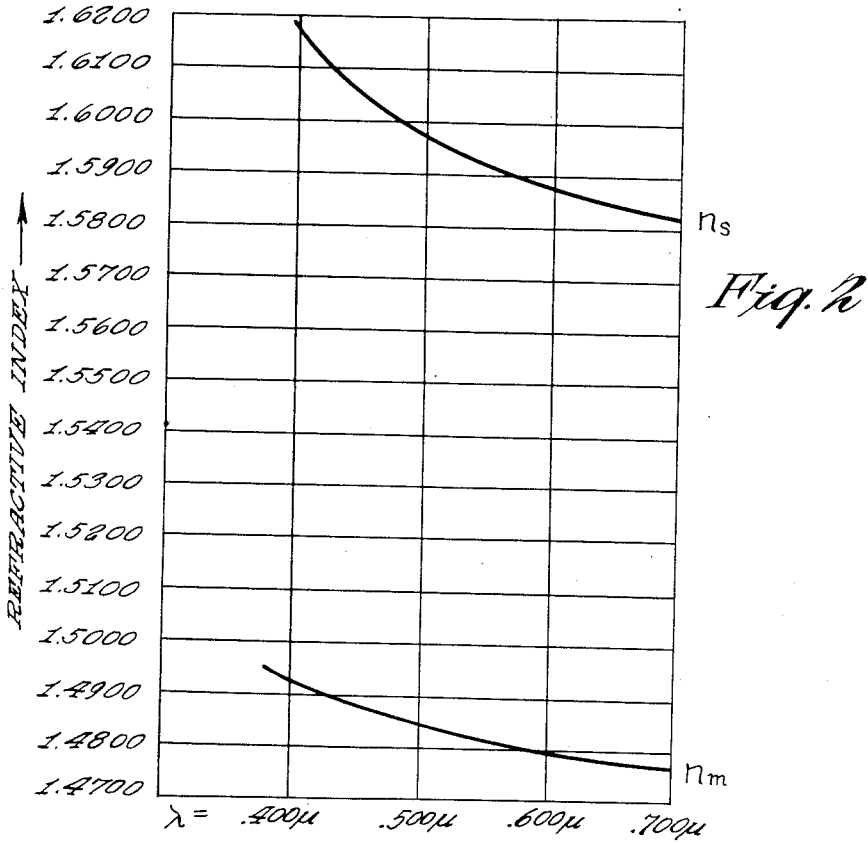
INVENTOR.
FRITS ZERNIKE
BY
Moses, Nolte, Crews & Berry
ATTORNEYS Nov. 4, 1952

F. ZERNIKE 2,616,334

PHASE MICROSCOPY

Filed May 12, 1948

INVENTOR.
FRITS ZERNIKE
BY
Moses, Nolte, Crews + Berry
ATTORNEYS

UNITED STATES PATENT OFFICE 2,616,334

PHASE MICROSCOPY

Frits Zernike, Baltimore, Md.

Application May 12, 1948, Serial No. 26,703
In the Netherlands November 25, 1947

3 Claims. (Cl. 88—39)

The invention aims at improving the image of microscopic objects and has especially to do with an arrangement which attains this aim by changing the phase of a part of the light rays which cooperate to form the image.

Ordinarily the contrasts in the observed image are obtained through different parts of the object transmitting light with unequal amplitudes or unequal colors. This can be obtained by staining the specimen whose different parts absorb the added dyes to different degrees. A structure appearing in this way may be designated as "amplitude-structure."

On the contrary, details which do not markedly differ in absorption from their surroundings will be difficult to observe in this way. It is true that they will in general influence the phase of the transmitted light, so that we may designate the object as a "phase-structure," but if this cannot be changed into an amplitude-structure by staining, its observation remains difficult or impossible.

In the German Patent 636,168 the present inventor described for this case an arrangement by which a part of the light traversing the microscope objective undergoes a phase change, preferably of 90°, with respect to the remaining part. In this so-called phase contrast method the first named part of the light traverses a phase strip which imparts to it the desired quarter wave difference of path. The corresponding illuminating device throws its light only on this strip, so that the final image results from the interference of this light with that diffracted at the object. In this way a phase-structure is found to appear as an amplitude-structure, and conversely.

It is clear that this consideration will be valid only for light of a certain wavelength which satisfies the relation $$\tfrac{1}{4}\lambda = (n-1)d$$

in which $\lambda$ represents the wavelength used, $n$ the refractive index of the substance of the phase strip and $d$ its thickness.

For light of a different wavelength the relation will no longer hold true, as the index varies in opposite sense to the wavelength, i. e., for a longer wavelength the index of refraction is smaller, and conversely.

The above is now considered the customary case of a phase strip, ordinarily of annular form, made by evaporation of transparent substances in a high vacuum, ordinarily combined with a layer of metal applied in the same way so as to control not only the phase but also the amplitude of the transmitted light. The same holds for the case that a shallow ring is removed by etching away the glass, e. g. of one of the lenses of the objective, the depth of etching satisfying the relation (1).

This method, covered by the German patent specification cited, is not satisfactory in every respect because the various components of the white light act differently. Thus the effect may be very small if the whole object is strongly colored, or if two adjacent parts have the same index for a certain wavelength but show a different dispersion, so that certain kinds of light show the effect, whereas others are useless and disturbing, especially when white light is used.

In order to obviate these difficulties, the invention is to control the course of the phase change throughout the spectrum, in a word to control its dispersion. This has never been proposed before. It is solved in the present invention by the combination of two new ideas. The first consists in making the phase strip out of a plastic film like nitro-cellulose and incorporating in this material some organic substance of high dispersion. The second idea consists in embedding the film in a resinous cement of relatively much lower dispersion. Conversely, a highly dispersive substance may be added to the cement, leaving the film of its natural low dispersion. The possibility of embedding a phase strip in a cement was stated in "Nature" 159, p. 829, June 21, 1947. However, it is there proposed for a different purpose, namely, for the precise control of the retardation, whereas the present invention uses the embedding for the purpose of obtaining any predetermined dispersion, that is, any predetermined course of the phase change with changing wave length. For the embedded strip the phase difference $p$ in degrees is given by $$p = 360\,(n_s - n_m)\,d/\lambda \qquad (2)$$

The repeated symbols have the same meaning as before while $n_s$ and $n_m$ represent the respective indices of refraction of the strip and the medium in which it is embedded. From relation (2) the combined effect of both measures mentioned above is seen as follows. By the addition of a highly dispersive substance the increase of $n_s$ from red to blue (Fraunhofer lines C→F) may be raised from 0.01 to 0.03. For a strip in air $n_s - 1$ will thus increase from C→F by about 5 percent. By the second measure the embedding $n_s - n_m$ may e. g. be only 0.03, its increase from C—F 0.015, that is 50 percent. It should be noted that the thickness $d$ must in this case be increased in the inverse proportion making it of the order of 5 microns. This is an additional advantage as it makes for an easy manipulation of the film.

The fundamental ideas of the invention may be briefly indicated by calling it "compensated dispersion phase contrast."

In the first embodiment of the invention $n_s - n_m$ is made proportional to the wave length so that the resulting phase difference is the same for all colors.

In another form of embodiment of the invention the phase difference is made zero for a certain color and equal to 90° for another color. In still a further form of embodiment the phase difference is made zero for a certain color, equal to plus 90° for another color, and equal to minus 90° for still a third color. In still another form of embodiment the phase strip can be made to have very different absorption for different colors.

In the drawing forming part of this specification

Fig. 1 is a graph showing refractive indexes as ordinates and wavelengths as abscissas, this graph having to do with a physical structure in which achromatic phase contrast is obtained; i. e., the phase displacement is one-quarter of a wavelength for all wavelengths;

Fig. 2 is a graph similar to Fig. 1 but having to do with a structure for producing reversal color phase contrast;

The practical significance of the possibilities discussed above will be shown by considering three special cases.

The first case is that in which the phase difference is independent of the wavelength. This may be called "achromatic phase contrast." A microscope objective lens with achromatic phase contrast is universally useful. Such an objective lens can be used to advantage for observing details in strongly colored objects and also gives the best chance to discover structures at the boundary of two media of nearly equal refraction. In photomicrography the achromatic phase ring has the important advantage that any desired color filter can be used with it.

The graph of Fig. 1 clearly illustrates a practical case in which the difference between the refractive indexes of the two media is constantly proportional to wave-length. By selecting media whose refractive characteristics are related to one another in the manner illustrated it is evident that a structure may be produced which satisfies Equation 2 for all wave lengths and hence for all colors.

Figure 4:
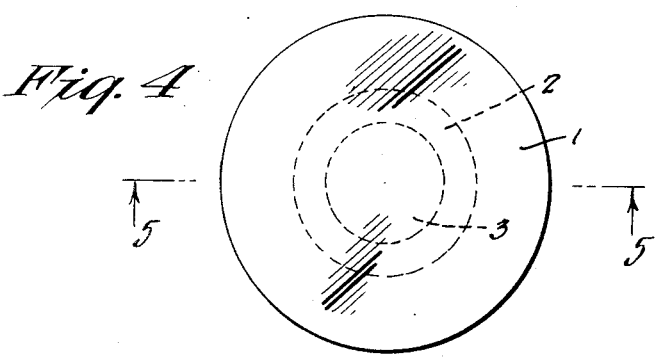
Fig. 4 is a plan view of a structure embodying principles of the invention.
Figure 5:
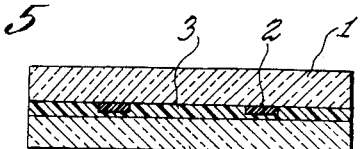
Fig. 5 is a sectional view taken upon the line 5—5 of Fig. 4, looking in the direction of the arrow.

A physical structure adapted to produce this relationship is illustrated in Figs. 4 and 5. To a body of glass 1 an annular phase strip 2, constituting the first medium and having a thickness $d$ equal to 5 microns is applied.

For producing the phase strip a thin film of cellulose nitrate or similar material is first made, as by dissolving cellulose nitrate in one of the usual solvents and spreading the solution in an even layer on a glass plate. After drying the resulting film should usually have a thickness of from 2 to 10 microns, but in the illustrative case the thickness should be 5 microns. To the solution different substances are added to control the optical as well as the mechanical properties of the film, such as plasticisers, dyes, or finely divided pigments and substances with a high optical dispersion. Substances belonging to the following groups, and which have more or less the properties of plasticisers, have been found useful for controlling the dispersion:

Naphthalene derivatives such as naphtholes and substituted naphthylamines.

Esters and amides and their derivatives of unsaturated aromatic acids such as cinnamic acid.

The film when formed is stripped from the glass and its thickness and optical properties are tested.

The phase ring or strip 2 is then cut out of it and fixed to the surface of the glass body 1.

Finally the phase ring or the strip is enclosed in a thin layer of cement. A good effect has been obtained by using a cement of lower index than the strip, but of higher dispersion so as to obtain achromatism. In this way the result is obtained that, whereas both indices, of film and of cement, increase with decreasing wavelength, their difference decreases and can be so adjusted as to be proportional to the wavelength.

These results can be obtained by using cements consisting of mixtures of resins like Canada balsam with substances of high refractive index and relatively low dispersion, such as chlorinated or brominated aromatic hydrocarbons, for instance, bromonaphthalene.

Another possible procedure is to apply the described solution of cellulose nitrate with the various additions directly to the glass surface to be used, for instance, to one of the lens surfaces to be cemented, as by spraying or other suitable means. In this connection a stencil mask can be used so that only the desired annular part is covered, or the layer first covering the whole surface can afterwards be partly removed. The further embedding in cement and the resulting effect are the same as above.

Finally a second body 4 of glass may be applied to cover the cement 3 in which the phase ring or strip 3 is embodied.

The second use is that in which the phase difference is 90° for one color and zero for the complementary color. This may be called "color phase contrast." An objective lens with color phase ring is especially useful for objects which show phase structures as well as amplitude structures. Suppose, for instance, that the ring gives a difference of 90° in the orange, and zero degrees in the blue green. A phase structure will then show darker details on a brighter background in the orange, but an even illumination in the blue green. Both colors together will give a colorless bright background and blue green details. For amplitude structures the reverse will hold, their details showing in an orange color. The effect will be clearest if the illuminating apparatus transmits only the here mentioned colors.

Figure 3:
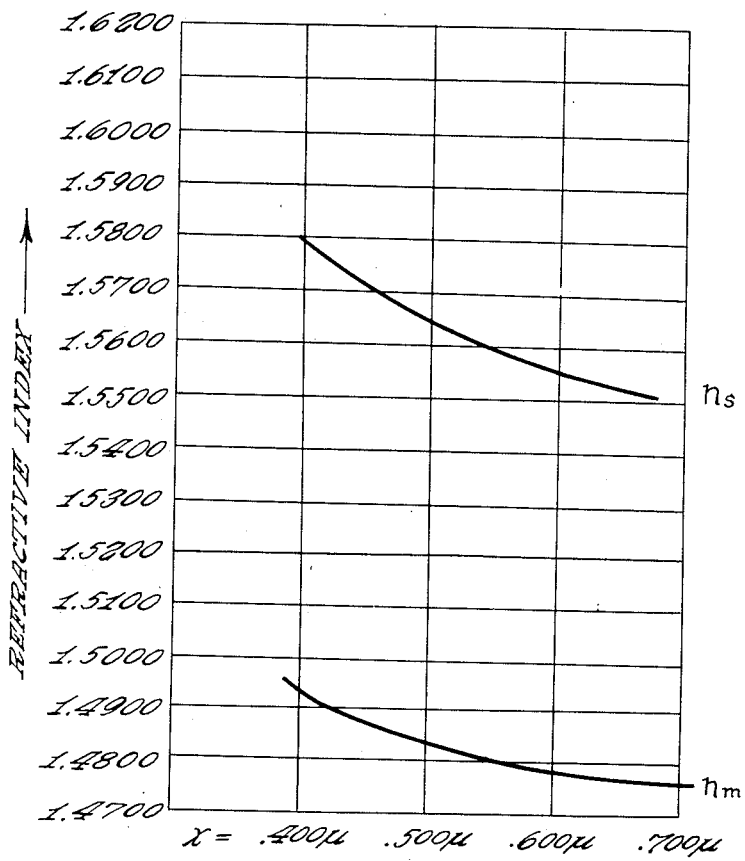
Fig. 3 is a graph similar to Fig. 1 having to do with a structure in which color phase contrast is produced.

Fig. 3 has to do with a color phase contrast arrangement. Here the thickness of the first medium, the phase ring, must be 6 microns and the structure may appear the same as in Figs. 4 and 5. The media are chosen to have the characteristics shown in Fig. 3. When $\lambda$ is equal to .485$\mu$ the relative phase difference is zero. For the same thickness of the phase ring when $\lambda$ is equal to .610µ the relative phase difference is minus 90° or minus .25λ.

The third case is one in which the phase difference is plus 90° for one color, zero for another color, and minus 90° for a third color. This may be called "reversal color phase contrast." An objective lens with reversal color phase ring is useful for objects which show phase structures as well as amplitude structures, in the same sense as a color phase contrast objective (as stated above), and also in that by the use of a filter passing the first color certain parts of the object which it may be desirable to study intensively may be made to appear dark against a lighter background, as more suitable for the study of growth or motion of such parts, or by use of a filter passing the third color to appear as light against a darker background, as may be more suitable for precise measurements of such parts.

Fig. 2 has to do with a reversal color phase contrast arrangement. In accordance with Fig. 2, where λ is equal to .465µ the resultant phase difference is plus 90° or plus .25λ. When λ is equal to .550µ the resultant phase difference is zero. When λ is equal to .700µ the resultant phase difference is equal to minus 90° or minus .25λ.

The above illustrative values are based upon the assumption that the thickness of the first medium is 5 microns. The physical structure would look exactly the same as that shown on Figs. 4 and 5, the only difference being that the media 2 and 3 selected in this case are different from those selected in the previously described examples.

If so desired, in attaining color phase contrast the difference can also be made to vary much more than in the case illustrated by Fig. 3. For instance, so as to satisfy the condition for color phase-contrast, making the phase difference 90° for one wavelength, whereas for the complementary wavelength the indices of film and cement are equal. In some cases it may be desirable to attain the same effect by giving two complementary colors phase differences of respectively 270° and 360°.

Apart from the advantage already amply discussed above of controlling the course of the phase difference through the spectrum, the method described has the further advantage that also the intensity of the directly traversing light can be controlled within wide limits.

This can be used to make achromatic phase strips of neutral grey color and as well of strongly selective absorption. Finally rings may be made which transmit only single discrete colors which at the same time are given different phase changes.

I have described what I believe to be the best embodiments of my invention. I do not wish, however, to be confined to the embodiments shown, but what I desire to cover by Letters Patent is set forth in the appended claims.

I claim:

1. For use in a microscope a phase plate device for producing compensated dispersion phase contrast in an image to produce a given phase shift at any selected wave length consisting of a light transmitting strip of material of the order of 2–10 microns thick embedded in a thin transparent resinous material, the whole forming a thin layer, giving a predetermined phase difference of P degrees between light rays which pass through the strip and those passing beside the strip according to the formula $$P = 360 (n_s - n_m) d/\lambda$$

in which $n_s$ and $n_m$ represent the respective indices of refraction of the strip and the material in which it is embedded, $d$ being the thickness of the strip and λ the wave length of the light, one of said materials having a relatively high dispersion with respect to the other, the relative difference in the dispersion of said materials being correlated to produce the desired compensated dispersion and phase difference in the different parts of the spectrum, and hence the desired color of the viewed image.

2. A device according to claim 1, characterized in that high dispersion substances are included in the strip selected from the class consisting of naphtoles and substituted napthylamines.

3. For use in a microscope a phase plate device for producing compensated dispersion phase contrast in an image to produce a given phase shift at any selected wave length consisting of a light transmitting phase strip element embedded in a transparent resinous element, the whole forming a thin layer, giving a predetermined phase difference of P degrees between light rays which pass through the strip and those passing beside the strip according to the formula $$P = 360 (n_s - n_m) d/\lambda$$

in which $n_s$ and $n_m$ represent the respective indices of refraction of the phase strip and the element in which it is embedded, $d$ being the thickness of the phase strip and λ the wave length of the light, one of said elements having a relatively high dispersion with respect to the other, the relative difference in the dispersion of said elements and the thickness of said strip being correlated to produce the desired compensated dispersion and phase difference in the different parts of the spectrum, and hence the desired color of the viewed image.

FRITS ZERNIKE.

REFERENCES CITED

The following references are of record in the file of this patent:

UNITED STATES PATENTS

| Number | Name | Date |
| --- | --- | --- |
| 1,926,716 | Ehringhaus | Sept. 12, 1933 |
| 2,259,512 | Barnes | Oct. 21, 1941 |
| 2,331,716 | Nadeau et al. | Oct. 12, 1943 |
| 2,427,689 | Osterberg et al. | Sept. 23, 1947 |
| 2,441,049 | West | May 4, 1948 |

FOREIGN PATENTS

| Number | Country | Date |
| --- | --- | --- |
| 636,168 | Germany | Oct. 7, 1936 |

OTHER REFERENCES

Physica: Zwenikw; vol. 9, 1942, pages 697, 698 and 982, publ. in Haarlem, Holland. (Copy in Naval Research Laboratory, Washington, D. C.)

Nature Magazine, vol. 159, June 21, 1947, pages 827 to 830 inc. (Copy in U. S. Patent Office Library.)